United States Patent
Ma et al.

(10) Patent No.: US 8,392,097 B2
(45) Date of Patent: Mar. 5, 2013

(54) METHOD FOR STARTING AN INTERNAL COMBUSTION ENGINE WITHIN A HYBRID POWERTRAIN

(75) Inventors: Qi Ma, Farmington Hills, MI (US); Robert Douglas Shafto, New Hudson, MI (US); Michael Simon, Plymouth, MI (US); Julian R. Verdejo, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 433 days.

(21) Appl. No.: 12/832,649

(22) Filed: Jul. 8, 2010

(65) Prior Publication Data

US 2012/0010802 A1    Jan. 12, 2012

(51) Int. Cl.
*F02D 41/06* (2006.01)
*F02D 41/10* (2006.01)

(52) U.S. Cl. .................. 701/113; 123/179.18; 123/182.1
(58) Field of Classification Search .................. 701/113, 701/22; 123/179.18, 179.28, 182.1; 180/65.265, 180/65.28, 65.285, 270
See application file for complete search history.

(56) References Cited

U.S. PATENT DOCUMENTS

2006/0289214 A1* 12/2006 Katsuhiro et al. ........... 180/65.4
2011/0118915 A1*  5/2011 Ortmann et al. ................ 701/22

* cited by examiner

*Primary Examiner* — Mahmoud Gimie

(57) ABSTRACT

A hybrid powertrain includes an internal combustion engine, an electro-mechanical transmission and an electric machine. In an engine starting routine, flow control devices located proximate each combustion chamber in the engine initially restrict airflow into the cylinders to allow for a starter motor to rotate the engine at lower expansion and compression torque whereafter rotation of the engine is transitioned to the electric machine.

13 Claims, 6 Drawing Sheets

METHOD FOR STARTING AN INTERNAL COMBUSTION ENGINE WITHIN A HYBRID POWERTRAIN

TECHNICAL FIELD

This disclosure is related to start operation of an internal combustion engine within a hybrid powertrain.

BACKGROUND

The statements in this section merely provide background information related to the present disclosure and may not constitute prior art.

An internal combustion engine in a hybrid powertrain is required to promptly start when determined by a control algorithm and based on operating conditions of the vehicle. High low-end torque is required to initially turn and accelerate the crankshaft to an acceptable speed before combustion. The initial high low-end torque is largely attributable to cylinder compression torque when intake manifold pressure is high and trapped air mass within the cylinders is high. One conventional approach to starting an internal combustion engine in a hybrid powertrain is accomplished by using the electric machine to accelerate the crankshaft of the engine to a speed at which combustion is initiated. However, in situations where the electric machine is multi-tasking, such as driving the vehicle with a large portion of full motor torque and starting the engine at the same time, this approach is complicated.

SUMMARY

A hybrid powertrain coupled to a driveline includes an engine, an electrical machine, and an electro-mechanical transmission selectively controllably operative to transmit torque among the engine, driveline and electrical machine. A method to start operation of the engine includes closing an airflow path from an intake manifold into a combustion chamber of the engine with a flow control device located between the intake manifold and the combustion chamber proximate the combustion chamber, initiating rotation of a crankshaft of the engine exclusively with a starter motor while the airflow path from the intake manifold into the combustion chamber of the engine is restricted by the flow control device, continuing rotation of the crankshaft of the engine with both the starter motor and the electrical machine while the airflow path from the intake manifold into the combustion chamber of the engine is restricted by the flow control device until a predetermined crankshaft speed is achieved, and continuing rotation of the crankshaft of the engine exclusively with the electrical machine while the airflow path from the intake manifold into the combustion chamber of the engine is opened by the flow control device.

BRIEF DESCRIPTION OF THE DRAWINGS

One or more embodiments will now be described, by way of example, with reference to the accompanying drawings, in which.

DETAILED DESCRIPTION

Figure 1:
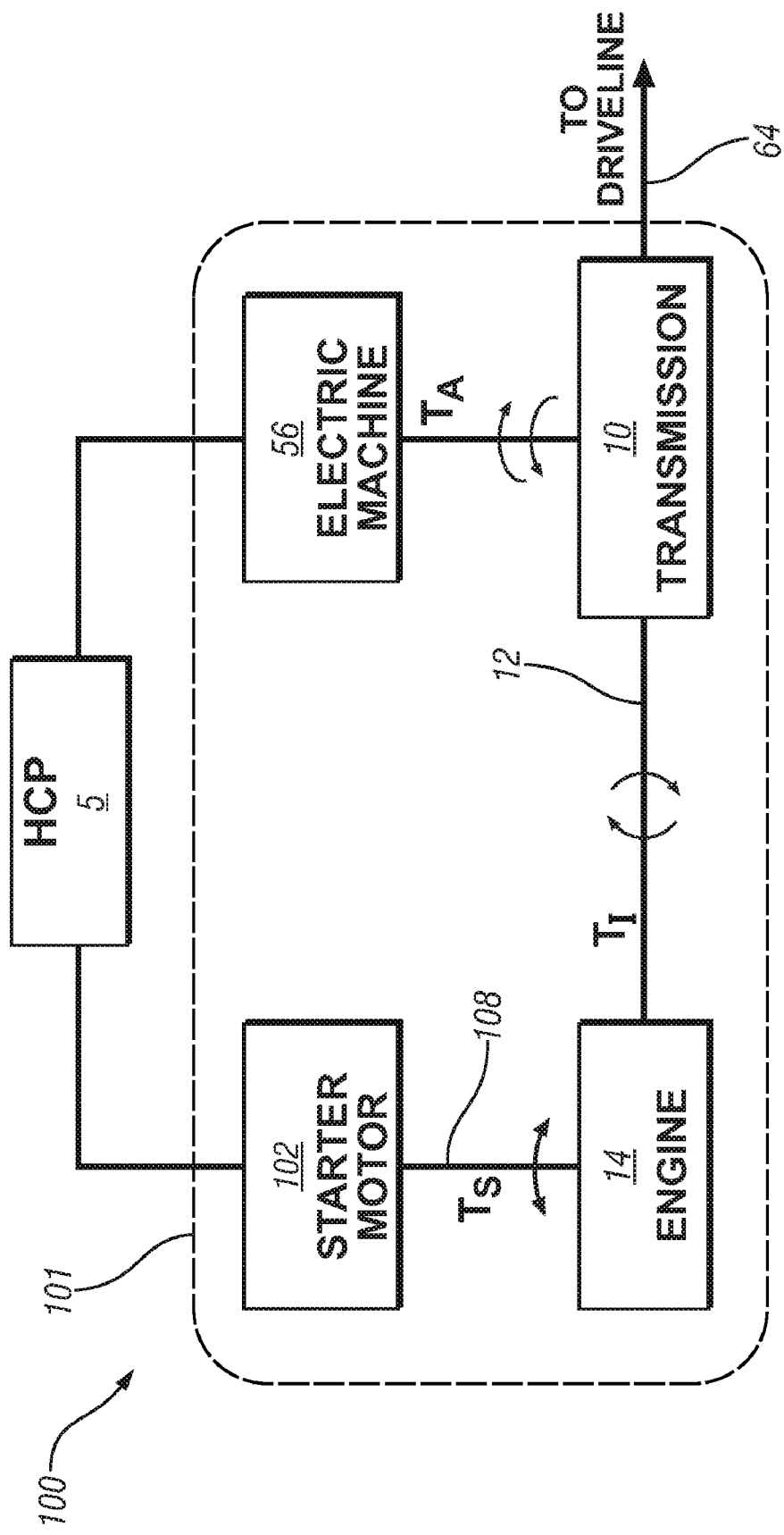
FIG. 1 is a schematic diagram of start operation of an internal combustion engine within a hybrid powertrain, in accordance with the present disclosure.

Referring now to the drawings, wherein the depictions are for the purpose of illustrating certain exemplary embodiments only and not for the purpose of limiting the same, FIG. 1 schematically illustrates a system 100 for starting an internal combustion engine 14 within a hybrid powertrain 101. The system 100 includes a hybrid control module (HCP) 5 and the hybrid powertrain 101 including the internal combustion engine 14, a starter motor 102, an electric machine 56 and a hybrid transmission device 100. A transmission input shaft 12 rotationally couples the hybrid transmission 10 to the crankshaft of the engine 14. A starter output shaft 108 rotationally couples the starter motor 102 to the crankshaft of the engine 10 and transmits torque, $T_S$, therebetween. The electric machine 56 is coupled to the hybrid transmission 10 and transmits motor torque $(T_A)$ therebetween. The transmission input shaft 12 is operative to accelerate the crankshaft of the engine 14 with an input torque $(T_I)$ that is provided from the $T_A$ of the electric machine 56 transferred to the transmission 10. Additionally, the electric machine 56 may be configured to provide $T_A$ through an output shaft 64 of the hybrid transmission, and thereby generate tractive output torque $(T_O)$ to a vehicle driveline. The exemplary HCP 5 provides supervisory control over other control modules within the hybrid powertrain and is configured to monitor and control the electric machine 56 and the starter motor 102 in association with the start operation of the internal combustion engine 14. It will be appreciated that a number of control configurations could be utilized, for example, with separate modules controlling electric machine 56 and another controlling start motor 102, with communication between the two controllers. Many control configurations are envisioned, and the disclosure is not intended to be limited to the particular embodiments described herein.

Figure 2:
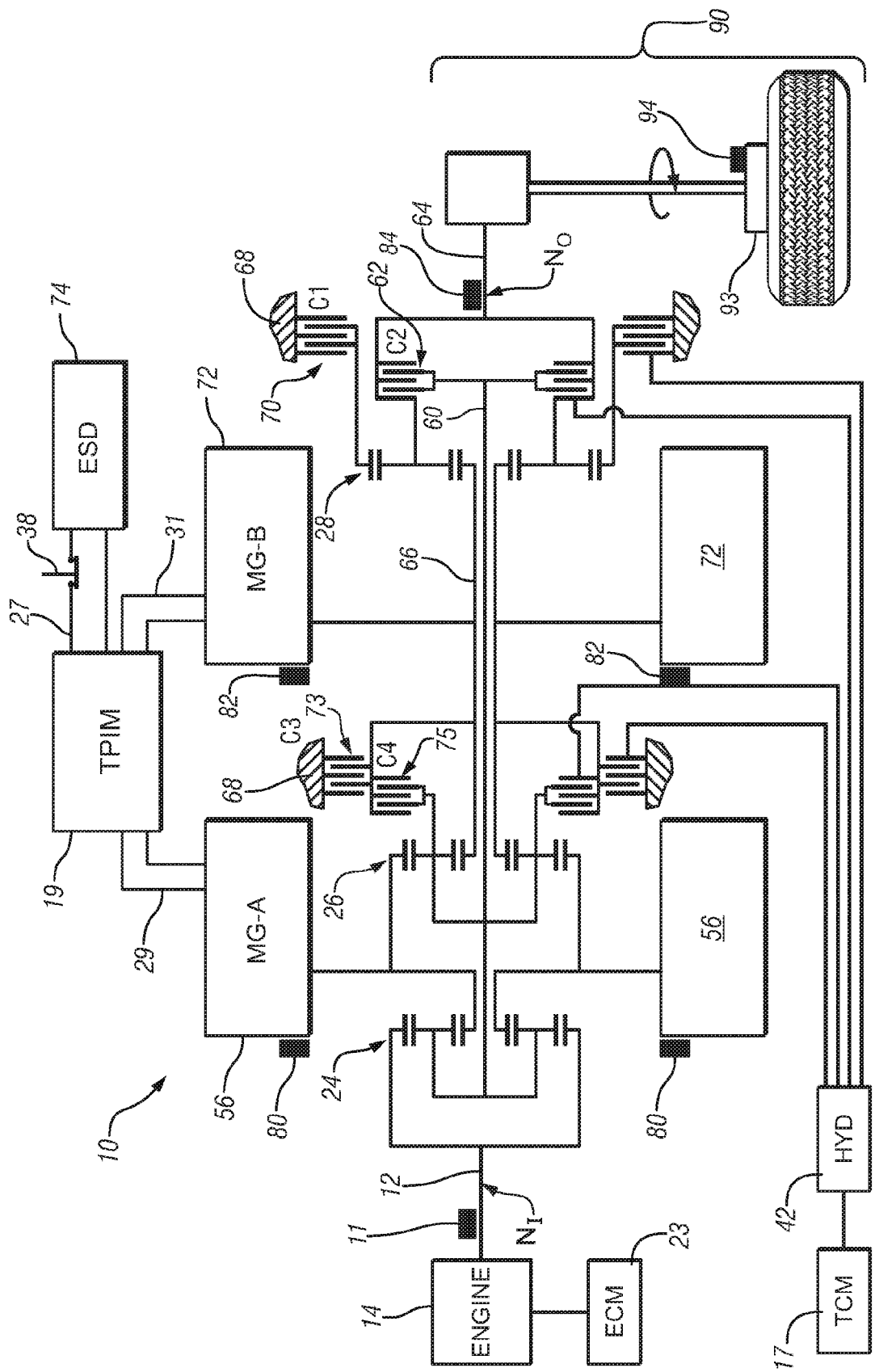
FIG. 2 is a schematic diagram of an exemplary hybrid powertrain, in accordance with the present disclosure.
Figure 3:
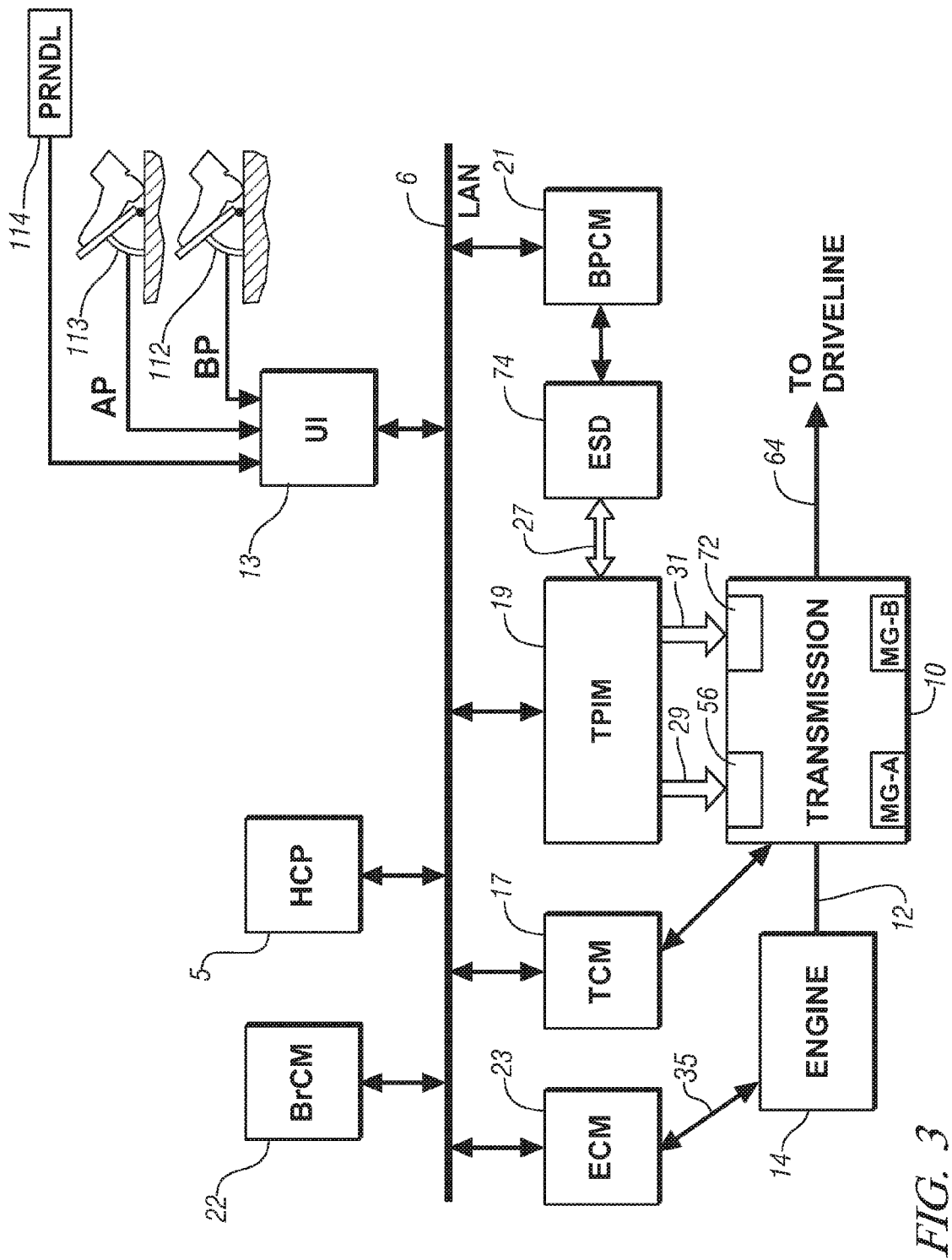
FIG. 3 is a schematic diagram of an exemplary architecture for a control system and hybrid powertrain, in accordance with the present disclosure.

Referring to FIGS. 2 and 3, an exemplary hybrid powertrain is depicted. The exemplary hybrid powertrain in accordance with the present disclosure is depicted in FIG. 2, including a two-mode, compound-split, electro-mechanical hybrid transmission 10 operatively connected to an engine 14 and torque machines including the first electric machine (MG-A) 56 and a second electric machine (MG-B) 72. The engine 14 and the torque machines, e.g., the first and second electric machines 56 and 72, each generate power which may be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 includes a multi-cylinder internal combustion engine selectively operative in several states to transfer torque to the transmission 10 via an input shaft 12, and may be either a spark-ignition or a compression-ignition engine. The engine 14 includes the crankshaft operatively coupled to the input shaft 12 of the transmission 10. A rotational speed sensor 11 monitors rotational speed of the input shaft 12. Power output from the engine 14, including rotational speed and engine torque, is effectively equal to the input speed $N_I$ and the input torque $T_I$, with any differences including twisting of components on the input shaft 12 between the engine 14 and the transmission 10, e.g., a hydraulic pump and/or a torque management device.

The exemplary transmission 10 includes three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (TCM) 17, is operative to control clutch states. Clutches C2 62 and C4 75 preferably include hydraulically-applied rotating friction clutches. Clutches C1 70 and C3 73 preferably include hydraulically-controlled stationary devices that may be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably include three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle, to provide output power to the driveline 90 that is transferred to vehicle wheels 93, one of which is shown in FIG. 2. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 3, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current may flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters and respective motor control modules configured to receive the torque commands and control inverter states therefrom for providing motor drive or regeneration functionality to meet the commanded motor torques $T_A$ and $T_B$. The power inverters include known complementary three-phase power electronics devices, and each includes a plurality of insulated gate bipolar transistors for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 3 is a schematic block diagram of the distributed control module system. The elements described hereinafter include a subset of an overall vehicle control architecture, and provide coordinated system control of the exemplary hybrid powertrain described in FIG. 2. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (ECM) 23, the TCM 17, a battery pack control module (BPCM) 21, and the TPIM 19. The hybrid control module (HCP) 5 provides supervisory control and coordination of the ECM 23, the TCM 17, the BPCM 21, and the TPIM 19. A user interface (UI) 13 is operatively connected to a plurality of devices through which a vehicle operator controls or directs operation of the electro-mechanical hybrid powertrain. The devices include an accelerator pedal 113 (AP), an operator brake pedal 112 (BP), a transmission gear selector 114 (PRNDL), and a vehicle speed cruise control. The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules may also be effected using a direct link, e.g., a serial peripheral interface (SPI) bus.

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors to determine states of other engine operating parameters including, e.g., a rotational speed of the crankshaft, a crank angle, an intake manifold absolute pressure, engine coolant temperature, ambient air temperature, and ambient pressure. The engine load may be determined, for example, from the intake manifold absolute pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches and selectively actuates pressure control solenoids and shift solenoids of the hydraulic control circuit 42 to selectively actuate the various clutches C1 70, C2 62, C3 73, and C4 75 to achieve various transmission operating range states, as described herein below.

The BPCM 21 is signally connected to sensors to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (BrCM) 22 is operatively connected to friction brakes on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Each of the control modules ECM 23, TCM 17, TPIM 19, BPCM 21, and BrCM 22 is preferably a general-purpose digital computer including a microprocessor or central processing unit, storage mediums including read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. Each of the control modules has a set of control algorithms, including resident software program instructions and calibrations stored in one of the storage mediums and executed to provide the respective functions of each control module. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

In response to operator input via the accelerator pedal 113 and brake pedal 112 as captured by the user interface 13, the HCP 5 and one or more of the other control modules determine torque commands to control the torque generative devices including the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described below.

Final vehicle acceleration may be affected by other factors including, e.g., road load, road grade, and vehicle mass. The engine state and the transmission operating range state are determined based upon a variety of operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state may be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation may be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 4:
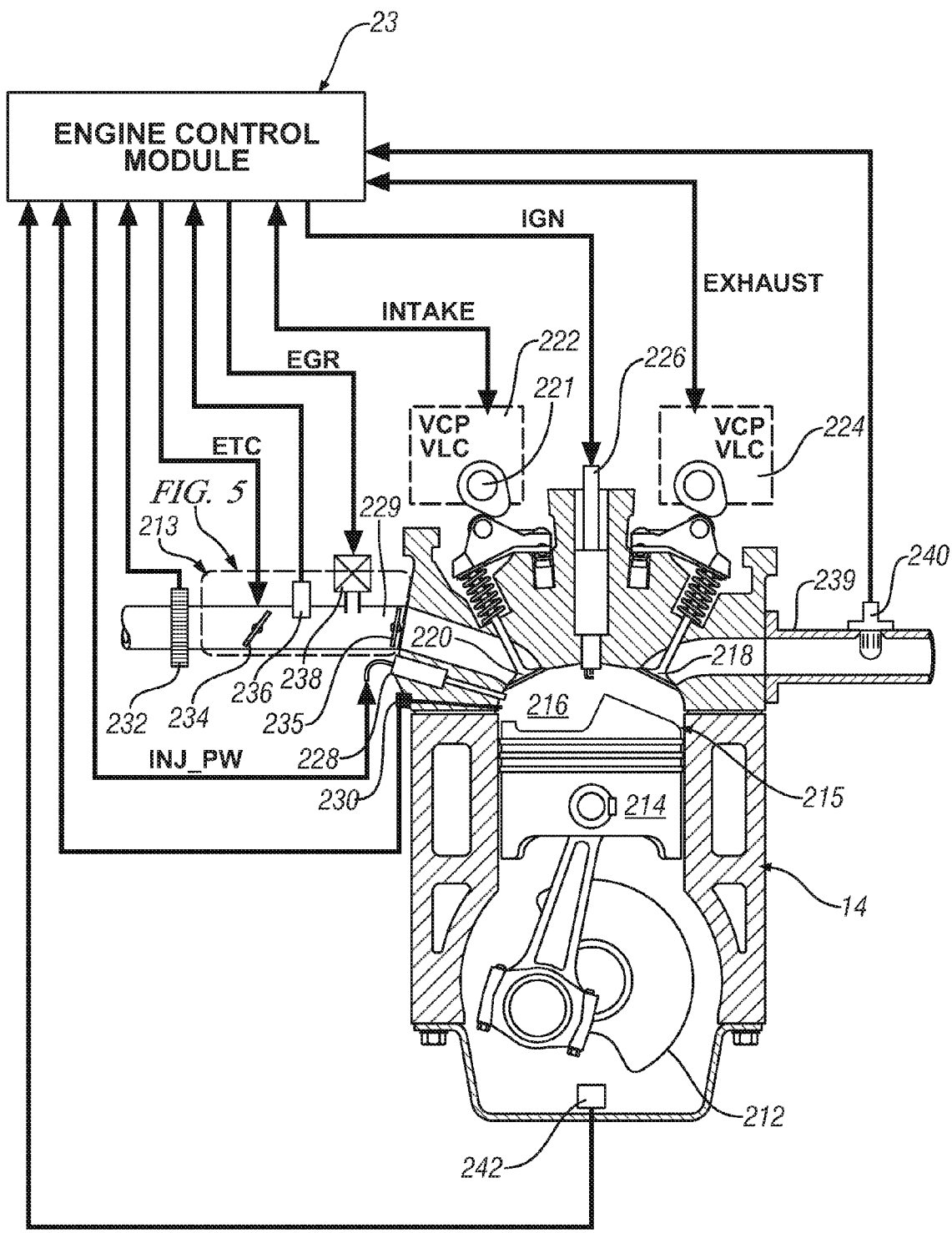
FIG. 4 is a schematic diagram of an internal combustion engine and an accompanying engine control module that have been constructed in accordance with the present disclosure.

In accordance with an exemplary embodiment of the present disclosure, FIG. 4 schematically shows an internal combustion engine 10 and the ECM 23 that have been constructed in accordance with an embodiment of the present disclosure. The disclosure may be applied to various internal combustion engine systems and combustion cycles.

The exemplary engine 14 includes a multi-cylinder internal combustion engine having reciprocating pistons 214 slidably movable in cylinders 215 which define variable volume combustion chambers 216. Each piston 240 is connected to a rotating crankshaft 212 by which linear reciprocating motion is translated to rotational motion. An air intake system 213 provides intake air to an intake manifold 229 which directs and distributes air into intake runners 231 of the combustion chambers 216. The air intake system includes airflow ductwork and devices for monitoring and controlling the airflow. The air intake devices preferably include a mass airflow sensor 232 for monitoring mass airflow and intake air temperature. A main throttle valve 234 preferably includes an electronically controlled butterfly valve that is used to controllably restrict airflow into the intake manifold 229 in response to a control signal (ETC) from the ECM 5. From the intake manifold 229, intake airflow is controllably restricted to individual cylinders by respective flow control devices located proximate to each individual cylinder. In a preferred embodiment, flow control devices include individual intake port throttle valves 235 which are electronically controlled butterfly valves that are used to control airflow within the individual intake runners 231. Throttle valves 235 are, in accordance with the present disclosure, configured to control airflow to the engine 14 during engine startup in response to a control signal from the ECM 23. A pressure sensor 236 in the intake manifold 229 is configured to monitor manifold absolute pressure and barometric pressure. An external flow passage recirculates exhaust gases from engine exhaust to the intake manifold 229, having a flow control valve referred to as an exhaust gas recirculation (EGR) valve 238. The ECM 23 is operative to control mass flow of exhaust gas to the intake manifold 229 by controlling opening of the EGR valve 238.

Airflow from the intake manifold 229 into the combustion chamber 216 is controlled by one or more intake valve(s) 220. Exhaust flow out of the combustion chamber 216 is controlled by one or more exhaust valve(s) 218 to an exhaust manifold 239. The engine 14 is equipped with systems to control and adjust openings and closings of the intake and exhaust valves 220 and 218. In one embodiment, the openings and closings of the intake and exhaust valves 220 and 218 may be controlled and adjusted by controlling intake and exhaust variable cam phasing/variable lift control (VCP/VLC) devices 222 and 224 respectively. The intake and exhaust VCP/VLC devices 222 and 224 are configured to control and operate an intake camshaft 221 and an exhaust camshaft 223, respectively. The rotations of the intake and exhaust camshafts 221 and 223 are linked to and indexed to rotation of the crankshaft 212, thus linking openings and closings of the intake and exhaust valves 220 and 218 to positions of the crankshaft 212 and the pistons 14.

The intake VCP/VLC device 222 preferably includes a mechanism operative to switch and control valve lift of the intake valve(s) 220 and variably adjust and control phasing of the intake camshaft 221 for each cylinder 215 in response to a control signal (INTAKE) from the ECM 23. The exhaust VCP/VLC device 224 preferably includes a controllable mechanism operative to variably switch and control valve lift of the exhaust valve(s) 218 and variably adjust and control phasing of the exhaust camshaft 223 for each cylinder 215 in response to a control signal (EXHAUST) from the ECM 23.

The intake and exhaust VCP/VLC devices 222 and 224 each preferably includes a controllable two-step variable lift control (VLC) mechanism operative to control magnitude of valve lift, or opening, of the intake and exhaust valve(s) 220 and 218, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 222 and 224 each preferably includes a variable cam phasing (VCP) mechanism to control and adjust phasing (i.e., relative timing) of opening and closing of the intake valve(s) 220 and the exhaust valve(s) 218 respectively. Adjusting the phasing refers to shifting opening times of the intake and exhaust valve(s) 220 and 218 relative to positions of the crankshaft 212 and the piston 214 in the respective cylinder 215. The VCP mechanisms of the intake and exhaust VCP/VLC devices 222 and 224 each preferably has a range of phasing authority of about 60°-90° of crank rotation, thus permitting the ECM 23 to advance or retard opening and closing of one of intake and exhaust valve(s) 220 and 218 relative to position of the piston 214 for each cylinder 215. The range of phasing authority is defined and limited by the intake and exhaust VCP/VLC devices 222 and 224. The intake and exhaust VCP/VLC devices 222 and 224 include camshaft position sensors to determine rotational positions of the intake and the exhaust camshafts 221 and 223. The VCP/

VLC devices 222 and 224 are actuated using one of electro-hydraulic, hydraulic, and electric control force, controlled by the ECM 23.

The engine 14 includes a fuel injection system, including a plurality of high-pressure fuel injectors 228 each configured to directly inject a mass of fuel into one of the combustion chambers 216 in response to a signal from the ECM 23. The fuel injectors 228 are supplied pressurized fuel from a fuel distribution system.

The engine 14 includes a spark-ignition system by which spark energy may be provided to a spark plug 226 for igniting or assisting in igniting cylinder charges in each of the combustion chambers 216 in response to a signal (IGN) from the ECM 23.

The engine 14 is equipped with various sensing devices for monitoring engine operation, including a crank sensor 242 having output RPM and operative to monitor crankshaft rotational position, i.e., crank angle and engine speed, wherein engine speed is effectively equal to the input speed $N_I$ of the input shaft 12. For simplicity, engine speed and rotational speed of the crankshaft 212 as measured by the crank sensor 242, will be referred to as $N_I$. In one embodiment, a combustion sensor 230 is configured to monitor combustion, and an exhaust gas sensor 240 is configured to monitor exhaust gases, typically an air/fuel ratio sensor. The combustion sensor 230 includes a sensor device operative to monitor a state of a combustion parameter and is depicted as a cylinder pressure sensor operative to monitor in-cylinder combustion pressure. The output of the combustion sensor 230 and the crank sensor 242 are monitored by the ECM 23 which determines combustion phasing, i.e., timing of combustion pressure relative to the crank angle of the crankshaft 212 for each cylinder 215 for each combustion cycle. The combustion sensor 30 may also be monitored by the ECM 23 to determine a mean-effective-pressure (IMEP) for each cylinder 215 for each combustion cycle. Preferably, the engine 14 and the ECM 23 are mechanized to monitor and determine states of IMEP for each of the engine cylinders 215 during each cylinder firing event. Alternatively, other sensing systems may be used to monitor states of other combustion parameters within the scope of the disclosure, e.g., ion-sense ignition systems, and non-intrusive cylinder pressure sensors.

The ECM 23 is preferably a general-purpose digital computer including a microprocessor or central processing unit, storage mediums including non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, including resident program instructions and calibrations stored in the non-volatile memory and executed to provide the desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the ECM 23 monitors inputs from the aforementioned sensors to determine states of engine parameters. The ECM 23 is configured to receive input signals from an operator (e.g., via a throttle pedal and a brake pedal) to determine an operator torque request the ECM 23 monitors the sensors indicating the $N_I$ and intake air temperature, and coolant temperature and other ambient conditions.

The ECM 23 executes algorithmic code stored therein to control the aforementioned actuators to form the cylinder charge, including controlling main and port throttle 234,235 position, spark-ignition timing, fuel injection mass and timing, EGR valve position to control flow of recirculated exhaust gases, and intake and/or exhaust valve timing and phasing on engines so equipped. Valve timing and phasing may include NVO and lift of exhaust valve reopening (in an exhaust re-breathing strategy) in one embodiment. The ECM 23 may operate to turn the engine 14 on and off during ongoing vehicle operation, and may operate to selectively deactivate a portion of the combustion chambers 16 or a portion of the intake and exhaust valves 220 and 218 through control of fuel and spark and valve deactivation. The ECM 23 may control air/fuel ratio based upon feedback from the exhaust gas sensor 240.

In an exemplary embodiment of the present disclosure, and referring to FIGS. 1-4, the HCP 5 is configured to start operation of the internal combustion engine 14 within the hybrid powertrain, wherein the ECM 23 monitors the $N_I$ and the intake manifold absolute pressure ($P_{INT}$) measured by the crank and pressure sensors 242,236, respectively. Based upon the monitored $N_I$ and the $P_{INT}$, the HCP 5 in communication with the ECM 23 sends a signal to the starter motor 102 and the electric machine 56 to turn or accelerate the crankshaft 212 before an engine firing event. Described in further detail below, the starter motor 102 may be used alone to initially turn the crankshaft 212, or in combination with the electric machine 56 to accelerate the crankshaft 212 subsequent to the initial turning.

Figure 5:
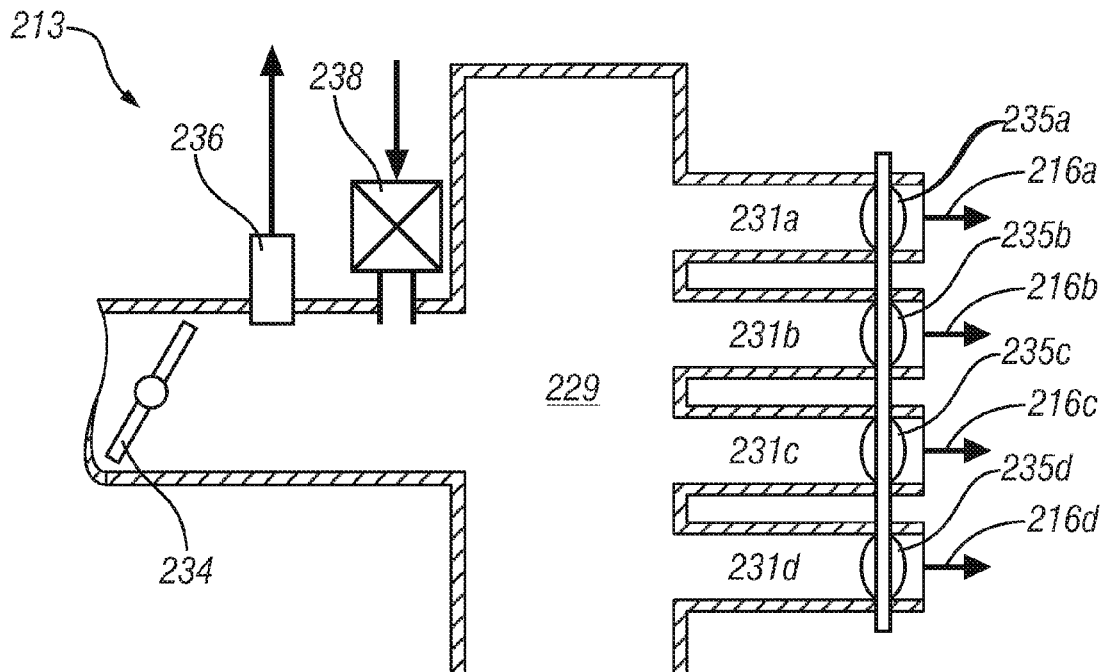
FIG. 5 illustrates a detailed view of the intake system illustrated in FIG. 4, in accordance with the present disclosure.

In an exemplary embodiment of the present disclosure, FIG. 5 depicts a detailed view of the intake system 213 shown in FIG. 4. The intake system 213 includes the intake manifold 229 and the plurality of intake runners 231 a, b, c and d of the corresponding combustion chambers 216 a, b, c and d. As previously described, the air intake system 213 provides intake air to the intake manifold 229 which directs and distributes air into the intake runners 231 of the combustion chambers 216. The main throttle valve 234 within the intake manifold 229 is electronically controlled via the HCP 5 and the ECM 23 shown in FIG. 3, and configured to control airflow to the intake runners 231. The intake port throttle valves 235 a, b, c and d within the passages of the corresponding intake runners 231 are electronically controlled via the HCP 5 and the ECM 23 and configured to control airflow from the intake manifold 229 to the combustion chambers 216. Additionally, the intake manifold 229 is configured to receive exhaust gases via the EGR valve 238. The pressure sensor 236 monitors the $P_{INT}$ within the intake manifold 229 and barometric pressure.

In an alternative embodiment, each port throttle valve 235 may be configured to open and close independent of one another and in association with the engine firing events of respective combustion chambers 216. In yet another alternative embodiment, flow control devices include individually actuatable intake valves, such as per-cylinder electrically actuated or hydraulically actuated intake valves. Such individually actuatable intake valves may be used to accomplish the functionality described above with respect to the intake port throttle valves 235.

Figure 6:
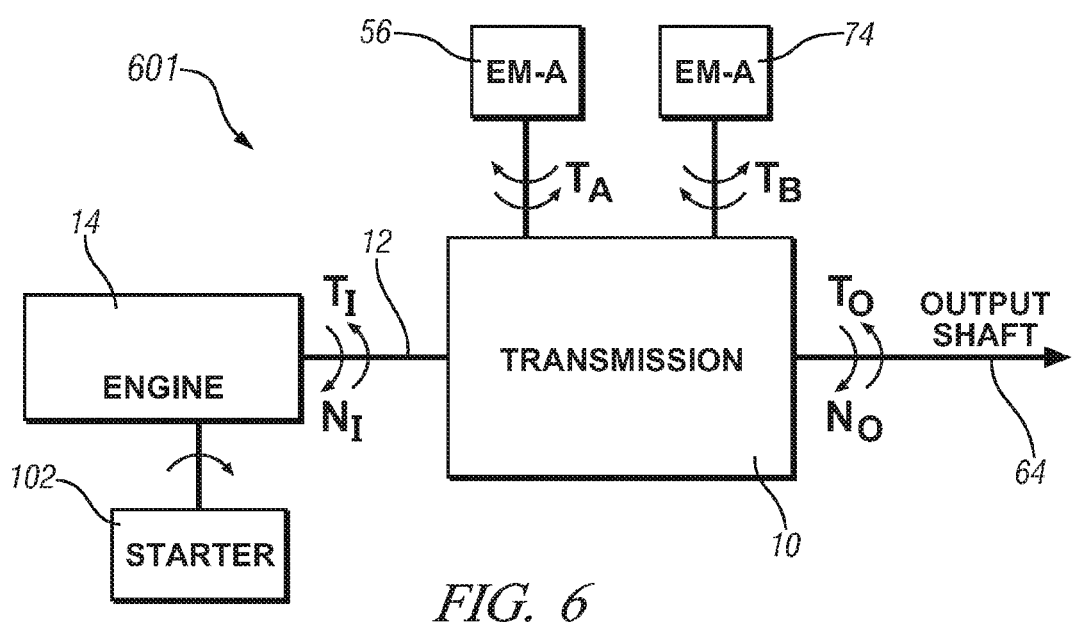
FIG. 6 is a schematic diagram of an exemplary hybrid powertrain configured to start operation of an internal combustion engine, in accordance with the present disclosure.

In an exemplary embodiment, a hybrid powertrain configured to start operation of an internal combustion engine is depicted in FIG. 6. The hybrid powertrain 601 includes the engine 14, the transmission 10, the starter motor 102, and the first and second electric machines 56, 74, respectively. The exemplary embodiment can, for example utilize the $T_B$ provided by the second electric machine 74 to generate motive output torque $T_O$ at output speed $N_O$ to the output member 64 of the transmission 10, wherein the $T_A$ provided by the first electric machine 56 may accelerate the crankshaft of the engine 14 having a rotational speed effectively equal to $N_I$ at torque $T_I$ during engine start up. The input shaft 12 of the transmission 10 rotationally couples the crankshaft to the transmission 10. It will be appreciated that a torque converter may be situated between the transmission 10 and the engine 14. Alternative embodiments may be configured so that the second electric machine 72 accelerates the crankshaft while the first electric machine 56 generates motive output torque to the output shaft 64 of the transmission 10.

According to one exemplary method and referring to FIGS. 3, 4 and 6, during start operation of the engine 14, the crankshaft 212 is initially turned with the starter motor 102, providing $T_S$. The main and port throttle valves 234,235, respectively, are closed during the initial turning. Closing the main and port throttle valves 234,235, respectively, chokes intake airflow effective to minimize air breathed into the combustion chambers 216. Minimizing air breathed into the combustion chambers 216 by closing the main and port throttle valves 234,235, respectively, is effective to decompress the combustion chambers 216. One having skill in the art will appreciate that compression within the cylinders is caused by the pistons acting upon intake air drawn in through the intake manifold. By choking intake air and expelling the air initially present within the combustion chambers, compression within the cylinders in subsequent cycles of the engine is avoided. Decompressing the combustion chambers 216 reduces the initial low-end compression torque ($T_{COMP}$) within the combustion chambers 216 that the $T_S$ must overcome to initially turn the crankshaft 212 to a speed effectively equal to $N_I$. In a non-limiting preferred example, the crankshaft 212 is initially turned one compression event for I4 engines and two compression events for V8 engines.

Subsequent to the initial turning of the crankshaft 212 and reduced initial low-end $T_{COMP}$, the crankshaft 212 is accelerated by both the starter motor 102 and the electric machine 56 until the $N_I$ exceeds a speed threshold. Once the $N_I$ exceeds the speed threshold, the starter motor 102 is deactivated while the crankshaft 212 is undergoing fast acceleration provided only by the $T_A$ of the first electric machine 56. In a non-limiting example the speed threshold is 300 RPM.

As the $N_I$ is undergoing fast acceleration provided by the electric machine 56 and due to the reduced $T_{COMP}$, the port throttle valves 35 open to an opening angle computed by the HCP 5 and the ECM 23. Opening the port throttle valves 235 is effective to decrease the $P_{INT}$ for an engine firing event, wherein the engine firing event is computed by the HCP 5 and the ECM 23 and measured by the combustion sensor 30. Additionally, opening the port throttle valves 235 allows air within the intake manifold to enter the combustion chambers 216. The air entering the combustion chambers 216 is effective to increase the $T_I$ required for the engine firing event.

When the $P_{INT}$ decreases below an intake manifold absolute pressure threshold ($P_{INT\_THLD}$)) the main throttle valve 234 begins to open based on the engine firing event. The control authority of intake airflow to the combustion chambers 216 provided by the port throttle valves 235 monotonically decays as the $P_{INT}$ decreases, wherein the main throttle valve 234 becomes dominating in controlling the intake air flow to the combustion chambers 216, and eventually takes full control of the intake air flow. Allowing the control authority provided by the port throttle valve 235 to monotonically decay and the main throttle valve 234 to become dominating in the control of intake airflow manages $T_I$ during the engine firing event, allowing the $T_I$ to gradually increase, and thus, reduce $N_I$ flare.

Figure 7:
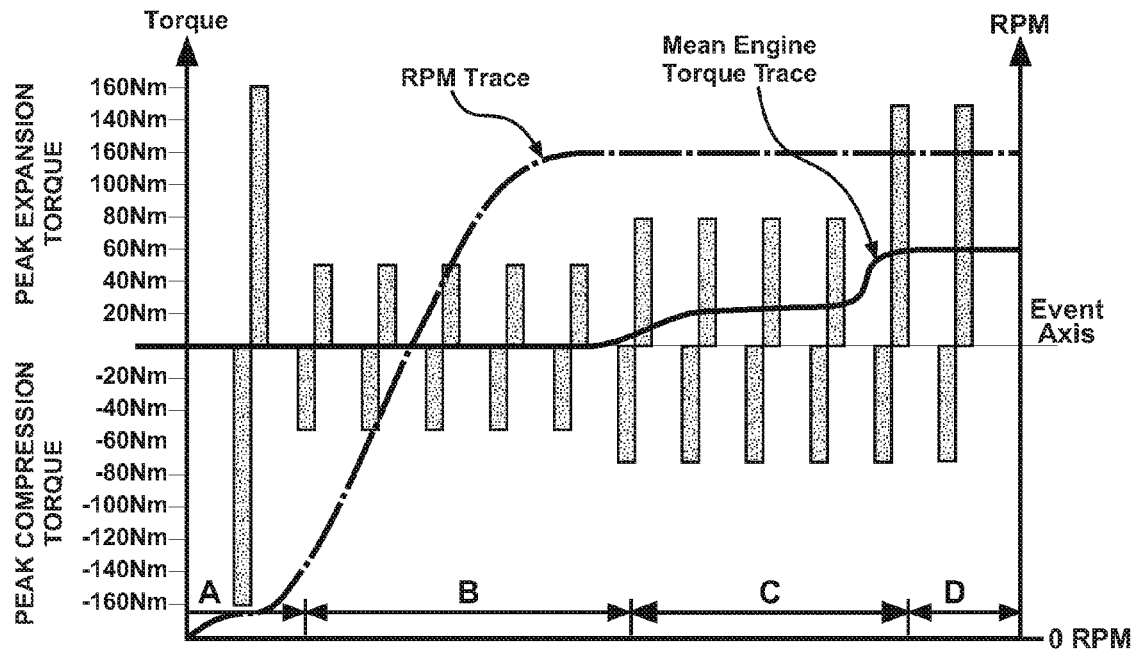
FIG. 7 is a graph illustrating engine speed as a function of peak expansion and compression torques during an engine starting event, in accordance with the present disclosure.

Referring to FIG. 7, a graph of engine speed response as a function of an engine starting event and peak compression and expansion torque is illustrated, in accordance with an exemplary embodiment of the present disclosure. At reference range A, the peak compression and expansion torques required to be overcome to initially turn the engine is illustrated. As mentioned above, peak compression and expansion torque is initially high due to trapped air mass within the combustion chambers. The starter motor provides motor torque ($T_S$) to initially turn the crankshaft of the engine, wherein the main and port throttle valves are closed to choke air mass from entering the combustion chambers, and thereby reduce the peak compression and expansion torques during engine start up. In a non-limiting example, the peak expansion and compression torques that the $T_S$ provided by the starter motor must overcome is −160 Nm and 160 Nm, respectively. In an alternative embodiment, each intake port throttle valve 235 is configured to open and close independent of one another and in association with engine firing events of respective combustion chambers.

Referring to reference range B, a starting event range where the crankshaft is accelerated by the starter motor and the first electric machine is illustrated. Due to the main and port throttle valves in the closed position, the airflow to the combustion chambers is choked, and thus, minimizing air breathed into the combustion chambers. Choking airflow to the combustion chambers is effective to decompress the combustion chambers, thereby reducing the peak expansion and compression torques. Due to the reduced peak expansion and compression torques, the crankshaft of the engine is rapidly accelerated with motor torques $T_S$ and $T_A$ provided by the starter motor and the electric machine, respectively. As illustrated during the starting event at reference range B, the rotational speed of the crankshaft, effectively equal to $N_I$ measured in RPM, rapidly accelerates to a threshold speed, $N_{I\_THLD}$ measured in RPM. In a nom limiting example, the $N_{I\_THLD}$ is 300 RPM.

Referring to reference range C, a starting event range is illustrated where the $N_{I\_THLD}$ has been reached, the starter motor is deactivated, the crankshaft is rotated by the electric machine and engine firing events occurs. The port throttle valves are opened to an opening angle effective to decrease the intake manifold absolute pressure for the engine firing event. Due to the opening of the intake port throttle valves, air from the intake manifold is entered into the combustion chambers, and thus, increasing the torque for the engine firing event. A mean engine torque trace is produced from the engine firing event representing the average torque generated from each combustion chamber for the engine firing event.

Referring to reference range D, a starting event range is illustrated when the $P_{INT}$ decreases below the $P_{INT\_THLD}$ during the engine firing event. When the $P_{INT}$ decreases below the $P_{INT\_THLD}$, the main throttle valve begins to open allowing air to enter the intake manifold. The control authority of the intake airflow to the combustion chambers provided by the intake port throttle valves monotonically decays as the $P_{INT}$ decreases. The main throttle valve becomes dominating in controlling the intake airflow to the combustion chambers, and eventually takes full control of the intake air flow required for combustion. As evidenced at reference range D, the peak expansion torque is increased due to desirable intake airflow for combustion. In a non limiting example, the peak compression and expansion torques as the main throttle valve takes full control of intake airflow is 70 Nm and 150 Nm, respectively.

As evidenced by the graph depicted in FIG. 7, closing the main and port throttle valves is effective to decompress the combustion chambers and reduce the initial peak compression and expansion torques within the combustion chambers that the $T_S$ provided by the starter motor must overcome to initially turn the crankshaft. Opening the intake port throttle valves is effective to decrease the intake manifold absolute pressure and increase the $T_I$ for the engine firing event. Allowing the control authority provided by the intake port throttle valves to monotonically decay and the main throttle valve to become dominating in the control of intake airflow, manages $T_I$ during the engine firing event, allowing the $T_I$ to gradually increase, and thus, reduce $N_I$ flare.

Figure 8:
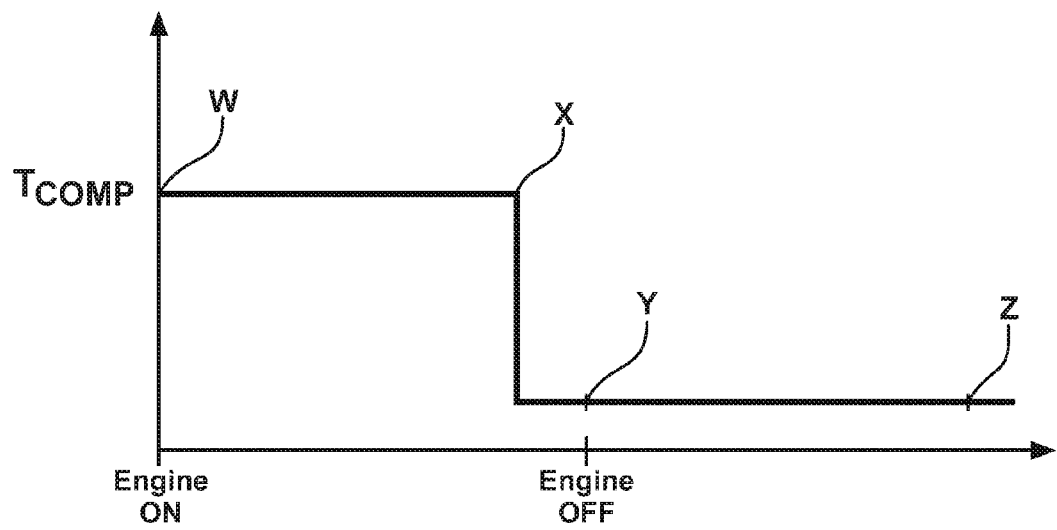
FIG. 8 is a graph illustrating compression torque as a function of an engine operating state in accordance with the present disclosure.

In an exemplary embodiment, a method for reducing the compression torque, $T_{COMP}$, for a subsequent engine start operation in a hybrid powertrain is illustrated in FIG. 8. Between reference points W and Y the engine is "on" and between reference points Y and Z the engine is "off." Between reference points W and X the engine is on and having a $T_{COMP}$ desirable for combustion. Just prior to the engine shutting off, as determined by the HCP 5 and ECM 23 of FIG. 3, the $T_{COMP}$ is reduced at reference point X. Reducing the $T_{COMP}$ within the combustion chambers is effective to reduce the torque provided by a starter motor or electric machine to initially turn and accelerate the crankshaft for a subsequent engine start up. Preferably, during the last few compression strokes before the engine is shut off, the main and port throttle valves are closed. Closing the main and port throttle valves is effective to choke intake airflow from entering the combustion chambers during the last few compression strokes. Hence, when intake air is choked from entering the engine, the amount of airflow breathed into the combustion chambers is minimized, and thereby, decompresses the combustion chambers. Decompressing the combustion chambers reduces the initial low-end $T_{COMP}$ that the torques provided by the starter motor and electric machine must overcome to initially turn and accelerate the crankshaft to an acceptable speed for combustion.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to start operation of an internal combustion engine within a hybrid powertrain coupled to a driveline, the powertrain comprising the engine, an electrical machine, and an electro-mechanical transmission selectively controllably operative to transmit torque among the engine, driveline and electrical machine, the method comprising, in turn:
    closing an airflow path from an intake manifold into a combustion chamber of the engine with a flow control device located between the intake manifold and the combustion chamber;
    initiating rotation of a crankshaft of the engine exclusively with a starter motor while the airflow path from the intake manifold into the combustion chamber of the engine is restricted by the flow control device;
    continuing rotation of the crankshaft of the engine with both the starter motor and the electrical machine while the airflow path from the intake manifold into the combustion chamber of the engine is restricted by the flow control device until a predetermined crankshaft speed is achieved; and
    continuing rotation of the crankshaft of the engine exclusively with the electrical machine while the airflow path from the intake manifold into the combustion chamber of the engine is opened by the flow control device.

2. The method of claim 1, wherein closing the airflow path from the intake manifold into the combustion chamber of the engine with the flow control device located between the intake manifold and the combustion chamber comprises closing an intake port throttle valve.

3. The method of claim 1, wherein closing the airflow path from the intake manifold into the combustion chamber of the engine with the flow control device located between the intake manifold and the combustion chamber comprises closing an intake valve.

4. Method to start operation of an internal combustion engine within a hybrid powertrain coupled to a driveline, the powertrain comprising the engine, an electrical machine, and an electro-mechanical transmission selectively controllably operative to transmit torque among the engine, driveline and electrical machine, the method comprising:
    closing a main throttle valve to restrict airflow into an intake manifold of the engine;
    closing an intake port throttle valve for restricting airflow from the intake manifold into a combustion chamber of the engine;
    activating a starter motor to initially turn a crankshaft of the engine using the starter motor with the main throttle valve closed and an intake port throttle valve closed;
    monitoring a rotational speed of the crankshaft;
    subsequent to the initial turning of the crankshaft, accelerating the crankshaft with the starter motor and the electrical machine;
    comparing the rotational speed of the crankshaft to a threshold speed;
    deactivating the starter motor when the rotational speed of the crankshaft exceeds the threshold speed; and
    firing the engine comprising initially opening only the intake port throttle valve to control airflow into the engine.

5. The method of claim 4, wherein initially turning the crankshaft of the engine comprises initially turning the crankshaft one compression event.

6. The method of claim 4, wherein initially turning the crankshaft of the engine comprises initially turning the crankshaft two compression events.

7. The method of claim 4, further comprising wherein firing the engine further comprises:
    monitoring the intake manifold absolute pressure;
    comparing said intake manifold absolute pressure to a pressure threshold; and
    opening the main throttle valve when the intake manifold absolute pressure decreases below the pressure threshold.

8. System for starting operation of an internal combustion engine within a hybrid powertrain coupled to a driveline, the powertrain comprising the engine, an electrical machine, and an electro-mechanical transmission selectively controllably operative to transmit torque among the engine, driveline and electrical machine, the system comprising:
    said engine including a plurality of combustion chambers fluidly coupled to an intake manifold;
    a plurality of flow control devices, each flow control device located between the intake manifold and a respective one of the plurality of combustion chambers to selectively restrict airflow to the combustion chambers;

a starter motor;

said electric machine;

a control module electrically coupled to said starter motor, said electric machine, and said plurality of flow control devices to, in turn and prior to an engine firing event, initiate rotation of the engine exclusively with the starter motor while restricting airflow into the plurality of combustion chambers through each flow control device, continue rotation of the engine with both the starter motor and the electrical machine while restricting airflow into the plurality of combustion chambers through each flow control device until a predetermined engine speed is achieved, and continue rotation of the crankshaft of the engine exclusively with the electrical machine while unrestricting airflow into the plurality of combustion chambers through each flow control device.

9. The system of claim 8, wherein each flow control device comprises an intake port throttle valve located in a respective intake runner.

10. The system of claim 8, wherein each flow control device comprises an intake valve located at a respective one of the plurality of combustion chambers.

11. The system of claim 8, wherein said engine further includes a main throttle valve to selectively restrict airflow to the intake manifold, and wherein said control module is electrically coupled to said main throttle valve to restrict airflow into the intake module through the main throttle valve until unrestricting airflow into the plurality of combustion chambers through each flow control device results in a predetermined reduction in intake manifold pressure.

12. The system of claim 11, wherein each flow control device comprises an intake port throttle valve located in a respective intake runner 13. The system of claim 11, wherein each flow control device comprises an intake valve located at a respective one of the plurality of combustion chambers.

\* \* \* \* \*